(12) United States Patent
Coop et al.

(10) Patent No.: US 8,989,951 B1
(45) Date of Patent: *Mar. 24, 2015

(54) MAINTAINING THE AIRWORTHINESS CONFIGURATION OF AIRCRAFT

(71) Applicant: The Boeing Company, Chicago, IL (US)

(72) Inventors: William P. Coop, Buckley, WA (US); Jose R. Elias, Seattle, WA (US); Lois Hill, Renton, WA (US); Shella A. Knoll, Orting, WA (US); David Robert Tilzer, Renton, WA (US); Charles K. Bautz, Jr., Seattle, WA (US)

(73) Assignee: The Boeing Company, Chicago, IL (US)

( * ) Notice: Subject to any disclaimer, the term of this patent is extended or adjusted under 35 U.S.C. 154(b) by 151 days.

This patent is subject to a terminal disclaimer.

(21) Appl. No.: 13/664,121

(22) Filed: Oct. 30, 2012

(51) Int. Cl.
*G01M 17/00* (2006.01)
*G01C 23/00* (2006.01)

(52) U.S. Cl.
CPC .................................. *G01C 23/005* (2013.01)
USPC ..................... 701/31.4; 701/29.1; 701/29.4

(58) Field of Classification Search
CPC ....... G07C 5/008; G07C 5/006; G01M 15/05; G01S 5/02
USPC ........................................ 701/29.1, 29.4, 31.4
See application file for complete search history.

(56) References Cited

U.S. PATENT DOCUMENTS

| | | | |
|---|---|---|---|
| 5,974,349 A * | 10/1999 | Levine | 701/29.6 |
| 6,618,654 B1 * | 9/2003 | Zaat | 701/31.9 |
| 7,545,270 B2 | 6/2009 | Pickering et al. | |
| 7,545,274 B2 | 6/2009 | Coop | |
| 7,548,802 B2 | 6/2009 | Avery et al. | |
| 7,551,086 B2 | 6/2009 | Coop et al. | |
| 2004/0039502 A1 * | 2/2004 | Wilson et al. | 701/29 |
| 2006/0055564 A1 * | 3/2006 | Olsen et al. | 340/994 |
| 2006/0248182 A1 * | 11/2006 | Glassco et al. | 709/223 |
| 2007/0112488 A1 * | 5/2007 | Avery et al. | 701/35 |
| 2007/0114280 A1 * | 5/2007 | Coop et al. | 235/385 |
| 2010/0023151 A1 * | 1/2010 | Shieh et al. | 700/105 |
| 2011/0298638 A1 * | 12/2011 | Groeneweg | 340/905 |

(Continued)

OTHER PUBLICATIONS

Coop et al., "Aircraft Rework Management," U.S. Appl. No. 13/644,827, filed Oct. 4, 2012, 42 pages.

(Continued)

*Primary Examiner* — Hussein A. Elchanti (74) *Attorney, Agent, or Firm* — Yee & Associates, P.C.

(57) ABSTRACT

A method and apparatus for maintaining the airworthiness configuration of an aircraft. Airworthiness configuration information for an aircraft is identified by a data processing system. The airworthiness configuration information identifies an airworthiness configuration of the aircraft comprising a number of components of the aircraft. A number of automated identification technology devices are attached to the aircraft. The number of automated identification technology devices include component information for the number of components. The component information is read from the number of automated identification technology devices by a reader. The component information read from the number of automated identification technology devices is compared, by a processor unit, to the airworthiness configuration information to determine whether the aircraft complies with the airworthiness configuration.

18 Claims, 8 Drawing Sheets

(56) References Cited

U.S. PATENT DOCUMENTS

2012/0127924 A1* 5/2012 Bandyopadhyay et al. .. 370/328
2012/0150380 A1* 6/2012 Whittaker .................... 701/29.4

OTHER PUBLICATIONS

Knox et al., "Aircraft Interior Component Maintenance," U.S. Appl. No. 13/782,475, filed Mar. 1, 2013, 47 pages.

Office Action, dated May 30, 2014, regarding U.S. Appl. No. 13/644,827, 19 pages.
Office Action, dated May 30, 2014, regarding U.S. Appl. No. 13/782,475, 15 pages.
Notice of Allowance, dated Aug. 12, 2014, regarding U.S. Appl. No. 13/644,827, 9 pages.
Notice of Allowance, dated Aug. 13, 2014, regarding U.S. Appl. No. 13/782,475, 9 pages.

* cited by examiner

MAINTAINING THE AIRWORTHINESS CONFIGURATION OF AIRCRAFT

BACKGROUND INFORMATION

1. Field

The present disclosure relates generally to systems and methods for maintaining the airworthiness of an aircraft. More particularly, the present disclosure relates to a system and method for using automated identification technology devices to determine whether an aircraft complies with a configuration for airworthiness.

2. Background

Aircraft may be maintained to ensure the airworthiness of the aircraft. Procedures for maintaining the airworthiness of an aircraft may be established by the manufacturer of the aircraft, by an operator of the aircraft, or both. Procedures for maintaining the airworthiness of an aircraft may be subject to government regulations.

For example, an aircraft manufacturer or other entity may publish instructions for continued airworthiness of an aircraft. The instructions for continued airworthiness may be specific for different types of aircraft. The instructions for continued airworthiness may specify procedures for inspection, maintenance, repair, and mandatory replacement times for various components of the aircraft. The instructions for continued airworthiness also may include a catalogue of components for the aircraft. Government regulations may require that the instructions for continued airworthiness of an aircraft are complied with before the aircraft is allowed to fly.

Determining whether the configuration of an aircraft complies with instructions for continued airworthiness, or other definitions of the airworthiness of the aircraft, may include confirming that various components of the aircraft are present and comply with various criteria for airworthiness. Currently, determining the airworthiness configuration of an aircraft may be performed manually. For example, current procedures for determining the airworthiness configuration of an aircraft may include visual inspection of various components of the aircraft by maintenance personnel. Such manual visual inspection of aircraft components may be performed carefully to avoid any errors and thus may be time consuming.

Automated identification technology may be used to automatically identify objects, collect data about the objects, and enter that data directly into a computer system with little or no human involvement. Automated identification technology devices may be attached to various objects. Examples of automated identification technology devices may include radio frequency identification (RFID) devices and contact memory buttons. Information identifying the objects and various characteristics of the objects may be stored in the devices. This information may be read from the devices and automatically entered into a computer system for processing using an appropriate reader device. Such automated identification technology has not been fully utilized for the inspection and maintenance of aircraft.

Accordingly, it would be beneficial to have a method and apparatus that takes into account one or more of the issues discussed above as well as possibly other issues.

SUMMARY

An illustrative embodiment of the present disclosure provides a method for maintaining the airworthiness configuration of an aircraft. Airworthiness configuration information for an aircraft is identified by a data processing system. The airworthiness configuration information identifies an airworthiness configuration of the aircraft comprising a number of components of the aircraft. A number of automated identification technology devices are attached to the aircraft. The number of automated identification technology devices includes component information for the number of components. The component information is read from the number of automated identification technology devices by a reader. The component information read from the number of automated identification technology devices is compared, by the data processing system, to the airworthiness configuration information to determine whether the aircraft complies with the airworthiness configuration.

Another illustrative embodiment of the present disclosure provides an apparatus comprising a data processing system, a number of automated identification technology devices, and a reader. The data processing system is configured to identify airworthiness configuration information for an aircraft. The airworthiness configuration information identifies an airworthiness configuration of the aircraft comprising a number of components of the aircraft. The number of automated identification technology devices are attached to the aircraft. The number of automated identification technology devices includes component information for the number of components. The reader is configured to read the component information from the number of automated identification technology devices and to compare the component information read from the number of automated identification technology devices to the airworthiness configuration information to determine whether the aircraft complies with the airworthiness configuration.

Another illustrative embodiment of the present disclosure provides another method for maintaining the airworthiness configuration of an aircraft. Component information is read from automated identification technology devices attached to a number of components on the aircraft. The component information comprises identification information identifying the number of components. The component information is compared to airworthiness configuration information identifying an airworthiness configuration of the aircraft to determine whether the number of components complies with the airworthiness configuration of the aircraft. Indicators identifying whether the number of components comply with the airworthiness configuration of the aircraft are displayed.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number", as used herein with reference to items, means one or more items. For example, "a number of different considerations" means one or more different considerations.

The different illustrative embodiments recognize and take into account that current procedures for determining whether an aircraft complies with an airworthiness configuration for the aircraft may include manual inspection of various aircraft components. For example, currently, many aircraft components may be inspected visually by maintenance personnel to determine whether the aircraft complies with the airworthiness configuration for the aircraft as identified in instructions for continued airworthiness or another definition of the airworthiness of the aircraft. Such visual inspections may be performed carefully to ensure that no error is made. Such inspections may be time consuming and thus may increase the cost of operating an aircraft.

For example, the airworthiness configuration of an aircraft may include a configuration of life vests associated with the seats in a cabin of the aircraft. A current method for determining whether a life vest configuration on an aircraft complies with the airworthiness configuration for the aircraft may take several hours to complete. Currently, an inspection of the life vest configuration of the aircraft may be performed by a mechanic who may tear all of the security seals and physically remove every life vest from the passenger seats on an aircraft to confirm the presence, serviceability, and configuration of the life vests. The life vests then may be reinstalled and new security seals installed.

As another example, the airworthiness configuration of an aircraft may include a configuration of oxygen generators on the aircraft. A current method for determining whether a configuration of oxygen generators on an aircraft complies with the airworthiness configuration for the aircraft may include performing an oxygen generator serviceability inspection by a mechanic. Currently, such an inspection may be performed by the mechanic who may tear open all passenger service unit oxygen generator access panels on the aircraft. Using a mirror and a flashlight, the mechanic then may perform a detailed visual inspection to confirm the serviceability of all oxygen generators. The mechanic may manually calculate the serviceability of the oxygen generators. The passenger service units then may be closed and a disturbed system check may be accomplished. This method of determining the airworthiness configuration of the oxygen generators on an aircraft may take several hours to complete.

The present disclosure provides a comprehensive and centrally managed system and method for maintaining the airworthiness configuration of an aircraft using automated identification technology devices. Illustrative embodiments may provide alternatives for complying with instructions for continued airworthiness or other definitions of the airworthiness of an aircraft that do not rely as heavily on time consuming manual inspections as current methods.

Illustrative embodiments may include a centrally managed data processing system including airworthiness configuration information for identifying an airworthiness configuration of an aircraft. The airworthiness configuration may include a number of components of the aircraft. A number of automated identification technology devices may be attached to the number of components of the aircraft that are part of the airworthiness configuration. The automated identification technology devices may include component information for the number of components. A reader may be used to read the component information from the number of automated identification technology devices when it is desired to determine whether the aircraft complies with the identified airworthiness configuration. The component information read from the automated identification technology devices may be compared to the airworthiness configuration information to determine whether the aircraft complies with the identified airworthiness configuration. The component information read from the automated identification technology devices may be saved by the data processing system to create a record of compliance.

Figure 1:
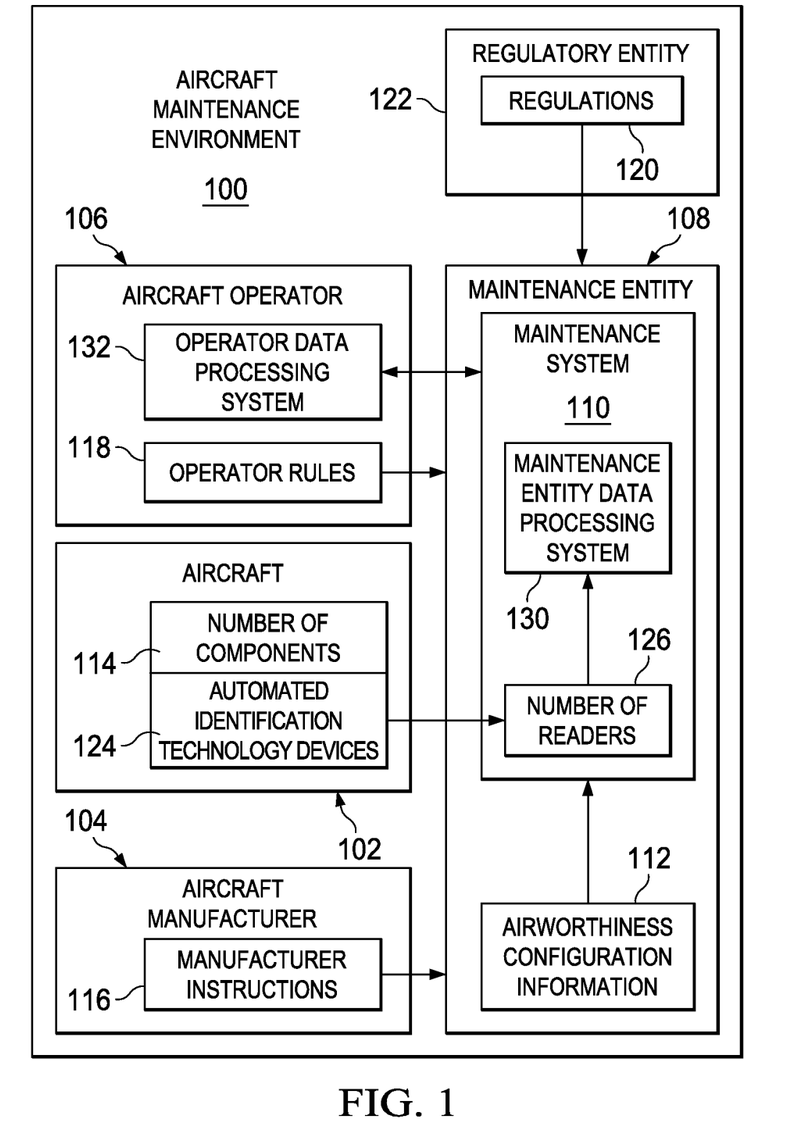
FIG. 1 is an illustration of a block diagram of an aircraft maintenance environment in accordance with an illustrative embodiment.

Turning now to FIG. 1, an illustration of a block diagram of an aircraft maintenance environment is depicted in accordance with an illustrative embodiment. In this illustrative example, aircraft maintenance environment 100 comprises aircraft 102. Aircraft 102 in aircraft maintenance environment 100 may be manufactured by aircraft manufacturer 104 and operated by aircraft operator 106. Aircraft 102 may include any type of commercial, military, or other aircraft. Aircraft operator 106 may be an airline, military or other government entity, or any other operator of aircraft 102.

Aircraft 102 may be maintained by maintenance entity 108. Maintenance entity 108 may be any entity for maintaining aircraft 102. For example, maintenance entity 108 may be aircraft operator 106 or a third party employed by aircraft operator 106 to maintain aircraft 102. For example, without limitation, maintenance entity 108 may include aircraft manufacturer 104.

In accordance with an illustrative embodiment, maintenance entity 108 may use maintenance system 110 to maintain aircraft 102. Maintenance system 110 may be configured to provide a centrally managed maintenance program for maintaining the airworthiness configuration of aircraft 102. In accordance with an illustrative embodiment, maintenance system 110 may be configured to maintain the airworthiness configuration of aircraft 102 in accordance with airworthiness configuration information 112. For example, without limitation, airworthiness configuration information 112 may identify number of components 114 of aircraft 102 that form the airworthiness configuration of aircraft 102. Airworthiness configuration information 112 also may identify various characteristics of number of components 114 that define the airworthiness configuration of aircraft 102. For example, without limitation, airworthiness configuration information 112 may include instructions for continued airworthiness or other definitions of the airworthiness configuration of aircraft 102.

Airworthiness configuration information 112 may include information from various sources. For example, airworthiness configuration information 112 may include manufacturer instructions 116 provided by aircraft manufacturer 104. For example, without limitation, manufacturer instructions 116 may include instructions for continued airworthiness. These instructions may specify procedures for inspection, maintenance, repair, and replacement of number of components 114 of aircraft 102. Airworthiness configuration information 112 also may include operator rules 118 provided by aircraft operator 106 for the inspection and maintenance of aircraft 102.

Airworthiness configuration information 112 may be subject to and satisfy regulations 120. For example, without limitation, regulations 120 may specify that aircraft 102 comply with the airworthiness configuration for aircraft 102, as defined by airworthiness configuration information 112, before aircraft 102 is allowed to fly. Regulations 120 also may specify record keeping for keeping a record of compliance. Regulations 120 may be issued by regulatory entity 122. For example, without limitation, regulatory entity 122 may be a government agency or other entity with authority to issue regulations 120.

In accordance with an illustrative embodiment, automated identification technology devices 124 may be associated with number of components 114 in the airworthiness configuration of aircraft 102 as defined by airworthiness configuration information 112. Automated identification technology devices 124 may be attached to aircraft 102 on or near corresponding number of components 114. For example, automated identification technology devices 124 may be attached to number of components 114. Automated identification technology devices 124 may have component information stored thereon for identifying number of components 114 and other information that may be used for determining whether number of components 114 complies with the airworthiness configuration for aircraft 102 as defined by airworthiness configuration information 112.

Maintenance system 110 may include number of readers 126. Number of readers 126 may be used to read the component information for number of components 114 from automated identification technology devices 124 when it is desired to determine whether aircraft 102 complies with the airworthiness configuration for aircraft 102 as defined by airworthiness configuration information 112.

The component information read from automated identification technology devices 124 may be provided from number of readers 126 to maintenance entity data processing system 130. Number of readers 126, maintenance entity data processing system 130, or both, may be configured to compare the component information read from automated identification technology devices 124 to airworthiness configuration information 112 to determine whether number of components 114, and, therefore, aircraft 102, complies with the airworthiness configuration for aircraft 102 as defined by airworthiness configuration information 112.

Indicators identifying whether number of components 114 comply with the airworthiness configuration for aircraft 102 as defined by airworthiness configuration information 112 may be displayed on number of readers 126. The determination of whether number of components 114 complies with the airworthiness configuration for aircraft 102 as defined by airworthiness configuration information 112 may be used by maintenance entity 108 or another entity to take any appropriate action. For example, without limitation, the determination of whether number of components 114 comply with the airworthiness configuration for aircraft 102 as defined by airworthiness configuration information 112 may be used by maintenance entity 108 or another entity to open or close a maintenance task or for any other purpose.

The component information read from automated identification technology devices 124 may be stored by maintenance entity data processing system 130 to create a record of compliance. The component information read from automated identification technology devices 124 also may be provided to operator data processing system 132 of aircraft operator 106 or to another data processing system. For example, aircraft operator 106 may store the component information read from automated identification technology devices 124 on operator data processing system 132 as a record of compliance or for any other purpose.

Figure 2:
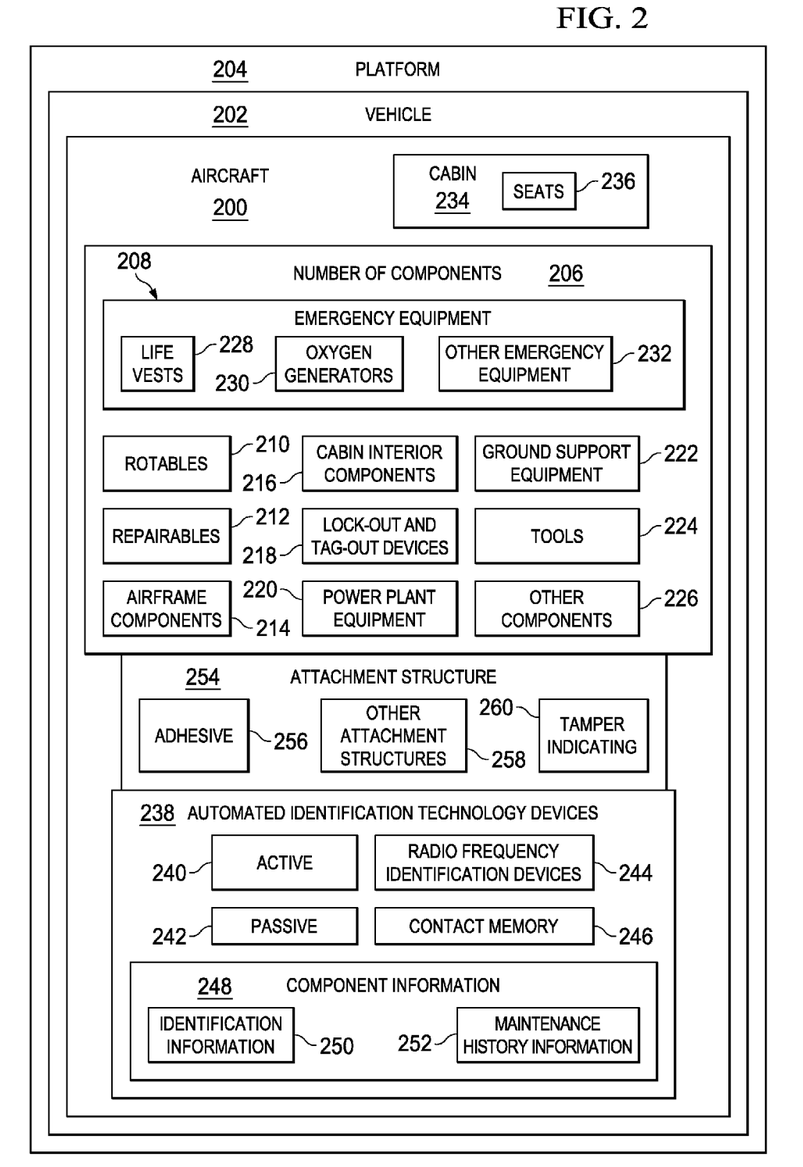
FIG. 2 is an illustration of a block diagram of an aircraft in accordance with an illustrative embodiment.

Turning now to FIG. 2, an illustration of a block diagram of an aircraft is depicted in accordance with an illustrative embodiment. In this example, aircraft 200 is an example of one implementation of aircraft 102 in FIG. 1.

Aircraft 200 is an example of vehicle 202. Illustrative embodiments may be used for maintaining the configuration of vehicle 202 other than aircraft 200. Vehicle 202 may be any vehicle configured for operation in the air, in space, on land, on water, under water, or in any other medium or combinations of media.

Vehicle 202 is an example of platform 204. Illustrative embodiments may be used for maintaining the configuration of platform 204 other than vehicle 202. For example, platform 204 may be any fixed or mobile structure.

Aircraft 200 may include number of components 206. Number of components 206 may include various parts of the airworthiness configuration of aircraft 200. Number of components 206 also may include components associated with the airworthiness configuration of aircraft 200 that may be used for the maintenance or operation of aircraft 200. For example, number of components 206 may include emergency equipment 208, rotables 210, repairables 212, airframe components 214, cabin interior components 216, lock-out and tag-out devices 218, power plant equipment 220, ground support equipment 222, tools 224, and other components 226.

Rotables 210 are components that may need periodic replacement. For example, without limitation, engines, generators, pumps, actuators, tires, and the like may be examples of rotables 210. Repairables 212 are components that typically may be repaired and returned to service. For example, without limitation, engines, generators, pumps, large actuators, many electric motors, and the like may be examples of repairables 212.

Emergency equipment 208 may include life vests 228, oxygen generators 230, and other emergency equipment 232. For example, without limitation, other emergency equipment 232 may include emergency medical kits. Emergency equipment 208 may be located in cabin 234 of aircraft 200. For example, without limitation, life vests 228 may be located under seats 236 in cabin 234 of aircraft 200.

Automated identification technology devices 238 may be attached to number of components 206. Automated identification technology devices 238 may be in various forms. For example, without limitation, automated identification technology devices 238 may be referred to as automated identification technology tags.

Automated identification technology devices 238 may be active 240 or passive 242. Active 240 automated identification technology devices 238 are powered by an internal battery. Passive 242 automated identification technology devices 238 operate without a separate power source and obtain power from a reader when interrogated by the reader to read information from automated identification technology devices 238 or to write information to automated identification technology devices 238.

Automated identification technology devices 238 may include radio frequency identification devices 244 and contact memory 246. Radio frequency identification devices 244 use radio frequency electromagnetic fields to transfer information when interrogated by a reader. The information stored in radio frequency identification devices 244 may be read from up to several yards away. Radio frequency identification devices 244 do not need to be within line of sight of a reader to be interrogated and may be imbedded in number of components 206.

Contact memory 246 also may be referred to as touch memory. Contact memory 246 is an electronic identification device that may be packaged in a button-shaped container. Information in contact memory 246 is accessed when a touch probe for a reader is brought into contact with contact memory 246.

Component information 248 may be stored in automated identification technology devices 238. Component information 248 may include identification information 250, maintenance history information 252, or any other information or various combinations of information related to corresponding number of components 206.

Identification information 250 may include information for identifying number of components 206 to which automated identification technology devices 238 may be attached. For example, without limitation, identification information 250 may include a part number, a part type, a location on aircraft 200 at which a component is located, or other information or combinations of information for identifying number of components 206. For example, without limitation, maintenance history information 252 may include information for identifying when number of components 206 were installed on aircraft 200, when maintenance was performed on number of components 206, what maintenance was performed, or other information or combinations of information describing the history of number of components 206 on aircraft 200.

Automated identification technology devices 238 may be attached to number of components 206 by attachment structure 254. Attachment structure 254 may include any appropriate structure for attaching automated identification technology devices 238 to number of components 206. For example, attachment structure 254 may include adhesive 256, other attachment structures 258, or a combination of structures for attaching automated identification technology devices 238 to number of components 206. For example, without limitation, automated identification technology devices 238 may be attached to number of components 206 by peeling paper from a self-adhesive backing. For example, without limitation, other attachment structures 258 may include perforations around the perimeter of the devices to allow the use of tie-wraps for fastening automated identification technology devices 238 to number of components 206. As another example, automated identification technology devices 238 may be embedded in number of components 206.

Attachment structure 254 may be tamper indicating 260. For example, without limitation, radio frequency identification devices 244 may be provided with tear-off provisions built in the device so that when the device is disturbed or damaged, the device is disabled and rendered inoperative by the separation of the microchip from the antenna and packaging.

Figure 3:
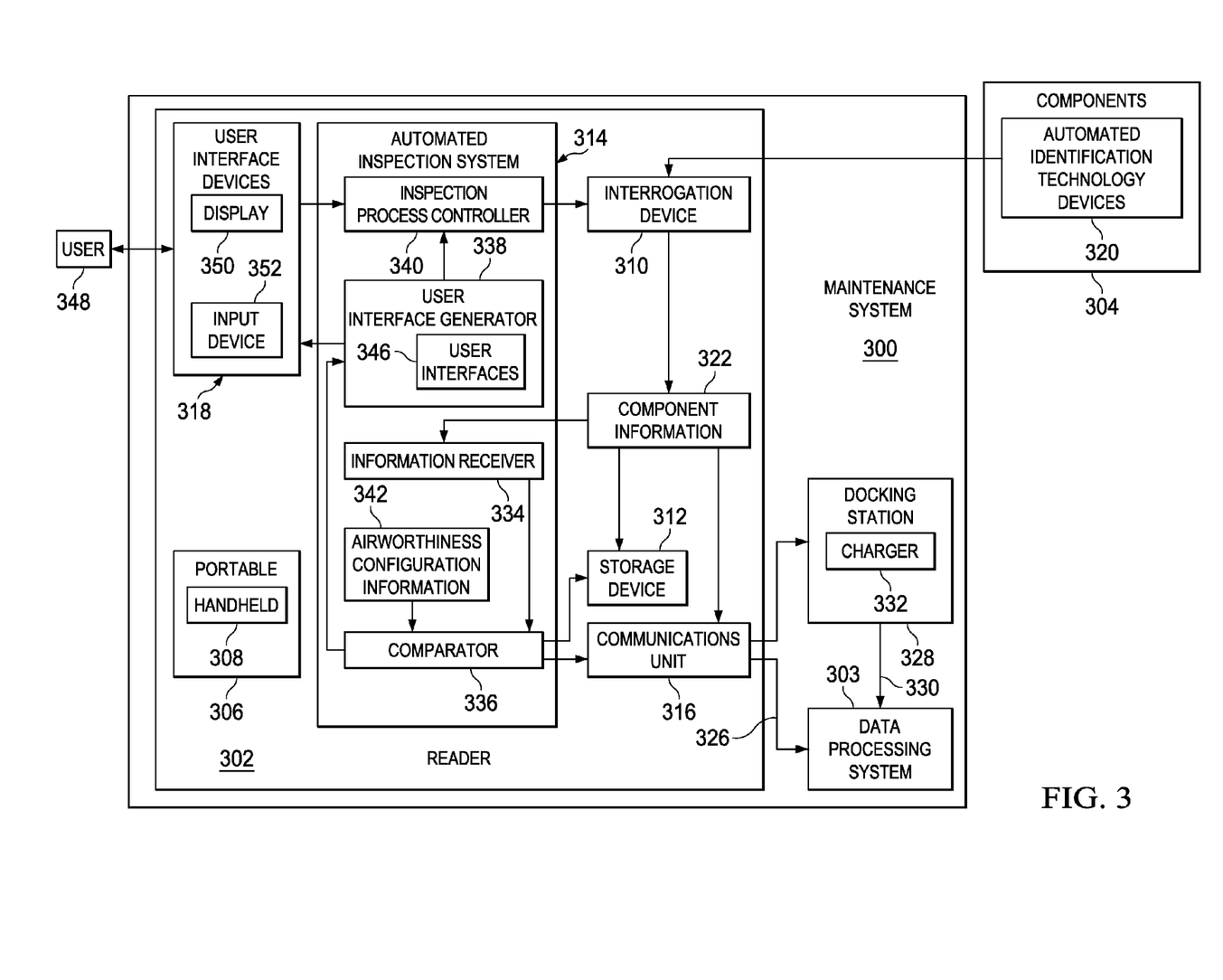
FIG. 3 is an illustration of a block diagram of a maintenance system in accordance with an illustrative embodiment.

Turning now to FIG. 3, an illustration of a block diagram of a maintenance system is depicted in accordance with an illustrative embodiment. In this example, maintenance system 300 is an example of one implementation of maintenance system 110 in FIG. 1. Maintenance system 300 may include reader 302 and data processing system 303. Reader 302 may be configured to read component information for components 304. For example, components 304 may be number of components 206 on aircraft 200 in FIG. 2.

Reader 302 may be portable 306. For example, reader 302 may be handheld 308. Reader 302 may include interrogation device 310, storage device 312, automated inspection system 314, communications unit 316, and user interface devices 318. Components 304 may have automated identification technology devices 320 attached thereto. Interrogation device 310 may be configured to activate automated identification technology devices 320 and to read component information 322 from automated identification technology devices 320. Component information 322 may be provided from interrogation device 310 to storage device 312 for storage on reader 302.

Component information 322 also may be provided from interrogation device 310 to communications unit 316 for communication to data processing system 303. Data processing system 303 may include any computer or other data processing system that may be separate from reader 302. Communications unit 316 may be configured to send component information 322 and other information to data processing system 303 at any appropriate time via wireless connection 326. Alternatively, or additionally, communications unit 316 may be configured to send component information 322 and other information to data processing system 303 via docking station 328 when reader 302 is placed in docking station 328. Docking station 328 may be connected to data processing system 324 via connection 330. Connection 330 may be a wired or wireless connection.

Reader 302 may be a battery powered device. In this case, docking station 328 also may be configured to operate as charger 332 for charging a battery in reader 302 when reader 302 is placed in docking station 328.

Component information 322 also may be provided from interrogation device 310 to automated inspection system 314. Automated inspection system 314 may include information receiver 334, comparator 336, user interface generator 338, and inspection process controller 340. Information receiver 334 may be configured to receive component information 322 from interrogation device 310.

Comparator 336 may be configured to compare component information 322 to airworthiness configuration information 342 to determine whether components 304 comply with and airworthiness configuration defined by airworthiness configuration information 342.

User interface generator 338 may be configured to generate user interfaces 346. For example, user interfaces 346 may include graphical user interfaces. User interface generator 338 may be configured to generate user interfaces 346 to display on user interface devices 318. User interface devices 318 may include display 350 for displaying information to user 348 and input device 352 for receiving input from user 348.

Inspection process controller 340 may be configured to control the process of an automated inspection by automated inspection system 314 in response to input from user 348. For example, user interface generator 338 may be configured to generate user interfaces 346 that allow user 348 to control an automated inspection of components 304 using reader 302. Based on input received from user 348, inspection process controller 340 may control interrogation device 310 to start and stop reading component information 322 from automated identification technology devices 320.

The illustration of FIG. 3 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 4:
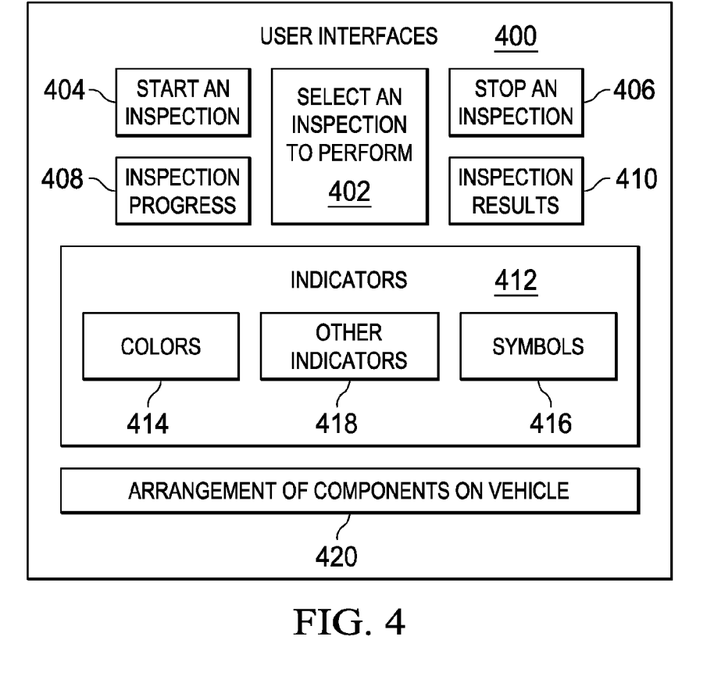
FIG. 4 is an illustration of a block diagram of user interfaces in accordance with an illustrative embodiment.

Turning now to FIG. 4, an illustration of a block diagram of user interfaces is depicted in accordance with an illustrative embodiment. In this example, user interfaces 400 may be examples of implementations of user interfaces 346 in FIG. 3.

User interfaces 400 may include interfaces that allow a user to select an inspection to perform 402, start an inspection 404, and stop an inspection 406. User interfaces 400 also may include interfaces for displaying inspection progress 408 and inspection results 410 to a user.

Inspection progress 408 and inspection results 410 may be displayed using indicators 412. For example, indicators 412 may include colors 414, symbols 416, other indicators 418, or various combinations of indicators for indicating inspection progress 408 and inspection results 410.

Inspection progress 408, inspection results 410, or both may be displayed using indicators 412 that are arranged in a manner corresponding to arrangement of components on vehicle 420. For example, if the components being inspected are life vests located under seats in a cabin of an aircraft, indicators 412 indicating inspection progress 408, inspection results 410, or both may be arranged in user interfaces 400 in an arrangement that corresponds to the arrangement of seats in the cabin of the aircraft.

Figure 5:
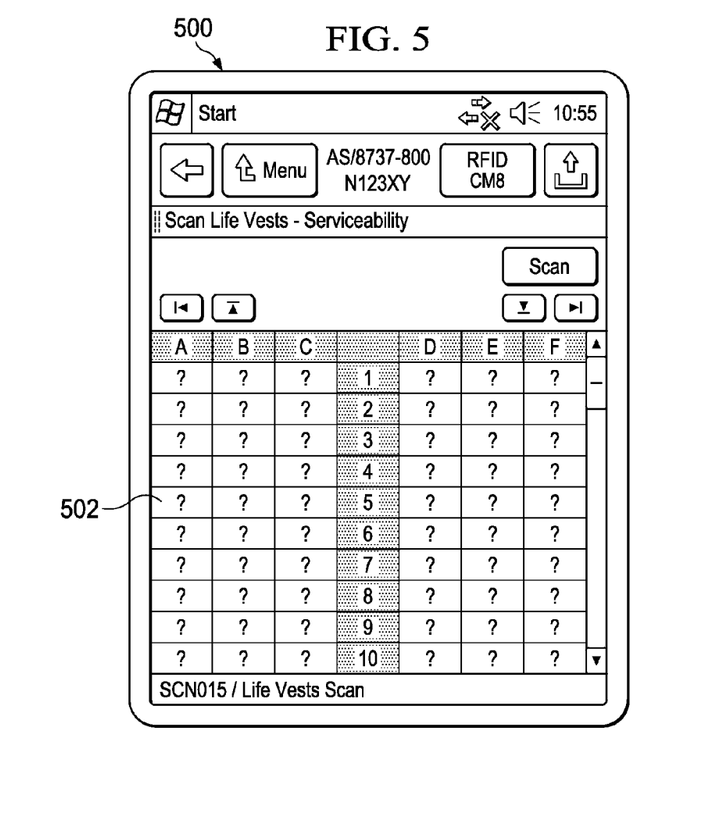
FIG. 5 is an illustration of a user interface for conducting an automated inspection of life vests on an aircraft in accordance with an illustrative embodiment.

Tuning now to FIG. 5, an illustration of a user interface for conducting an automated inspection of life vests on an aircraft is depicted in accordance with an illustrative embodiment. In this example, user interface 500 is an example of one implementation of user interfaces 400 in FIG. 4.

In this example, indicators 502 are arranged in a manner corresponding to the arrangement of seats in a cabin of an aircraft. At this point, all of the indicators are question marks, indicating an inspection has not been completed for any of the life vests under the seats in the cabin of the aircraft.

Figure 6:
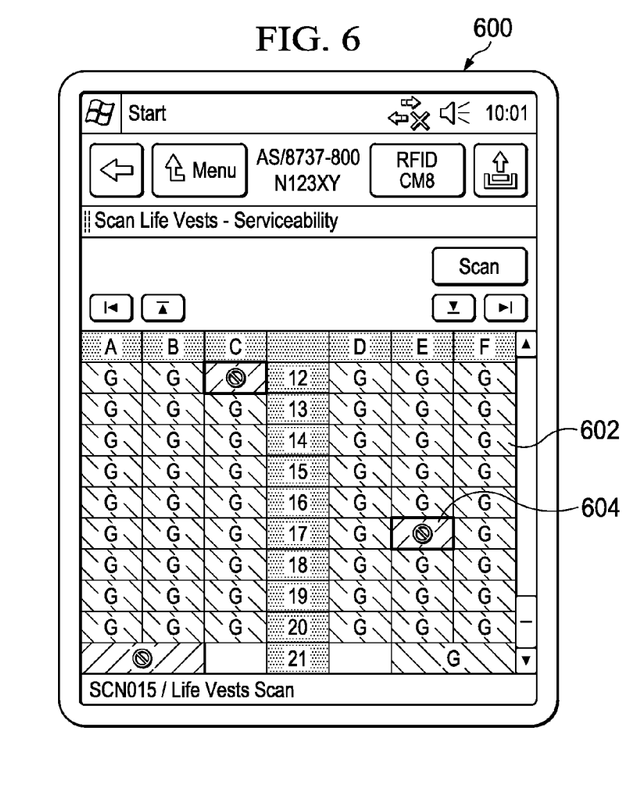
FIG. 6 is an illustration of a user interface after conducting an automated inspection of life vests on an aircraft in accordance with an illustrative embodiment.

Turning now to FIG. 6, an illustration of a user interface after conducting an automated inspection of life vests on an aircraft is depicted in accordance with an illustrative embodiment. In this example, user interface 600 is an example of user interface 500 in FIG. 5 after conducting an automated inspection of life vests on an aircraft.

In this example, the indicator symbol G 602 indicates that a life vest on the aircraft has been inspected and has passed the inspection. The indicator symbol of a circle with a diagonal line 604 indicates that the life vest under seat E17 has not passed the inspection.

Figure 7:
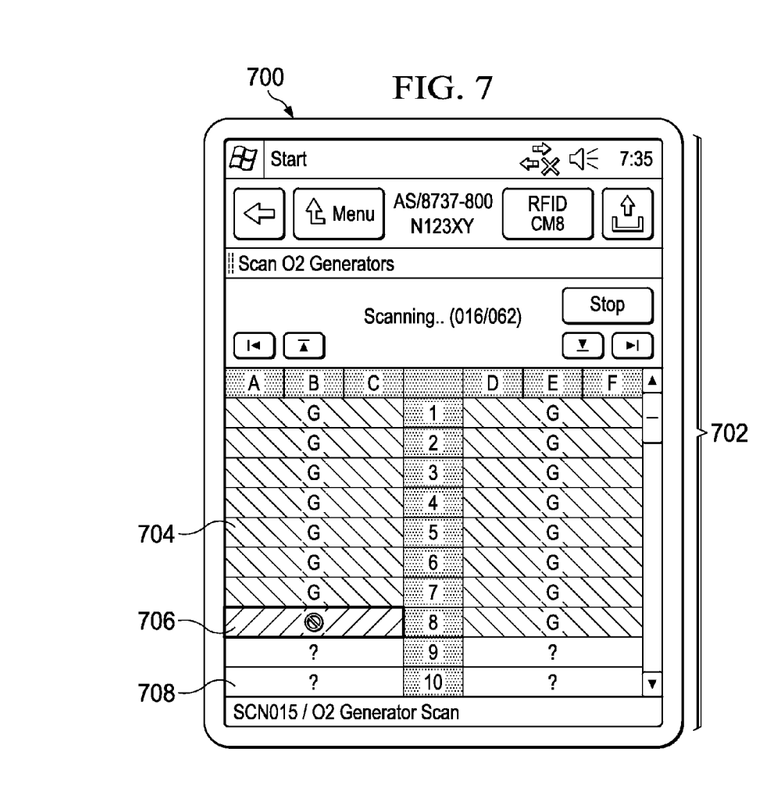
FIG. 7 is an illustration of a user interface during an automated inspection of oxygen generators on an aircraft in accordance with an illustrative embodiment.

Turning now to FIG. 7, an illustration of a user interface during an automated inspection of oxygen generators on an aircraft is depicted in accordance with an illustrative embodiment. In this example, user interface 700 is an example of another implementation of user interfaces 400 in FIG. 4.

In this example, indicators 702 are arranged in a manner corresponding to the arrangement of oxygen generators in a cabin of an aircraft. In this example, the indicator symbol G 704 indicates that an oxygen generator on the aircraft has been inspected and has passed the inspection. The indicator symbol of a circle with a diagonal line 706 indicates that the oxygen generator over seat 8B has not passed the inspection. Indicators that are question marks 708 indicate oxygen generators for which an inspection has not been completed.

Figure 8:
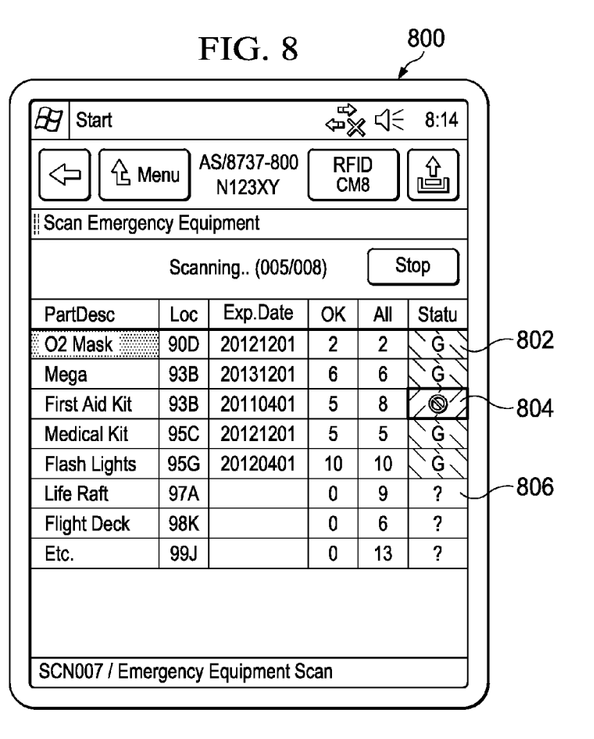
FIG. 8 is an illustration of a user interface showing progress of a number of automated inspections of emergency equipment on an aircraft in accordance with an illustrative embodiment.

Turning now to FIG. 8, an illustration of a user interface showing progress of a number of automated inspections of emergency equipment on an aircraft is depicted in accordance with an illustrative embodiment. In this example, user interface 800 is an example of another implementation of user interfaces 400 in FIG. 4.

In this example, the indicator symbol G 802 indicates an inspection that has been performed and where all of the components inspected have passed the inspection. The indicator symbol of a circle with a diagonal line 804 indicates an inspection that has been performed and at least one of the components inspected has not passed the inspection. Indicators that are question marks 806 indicate systems for which an inspection has not been completed.

Figure 9:
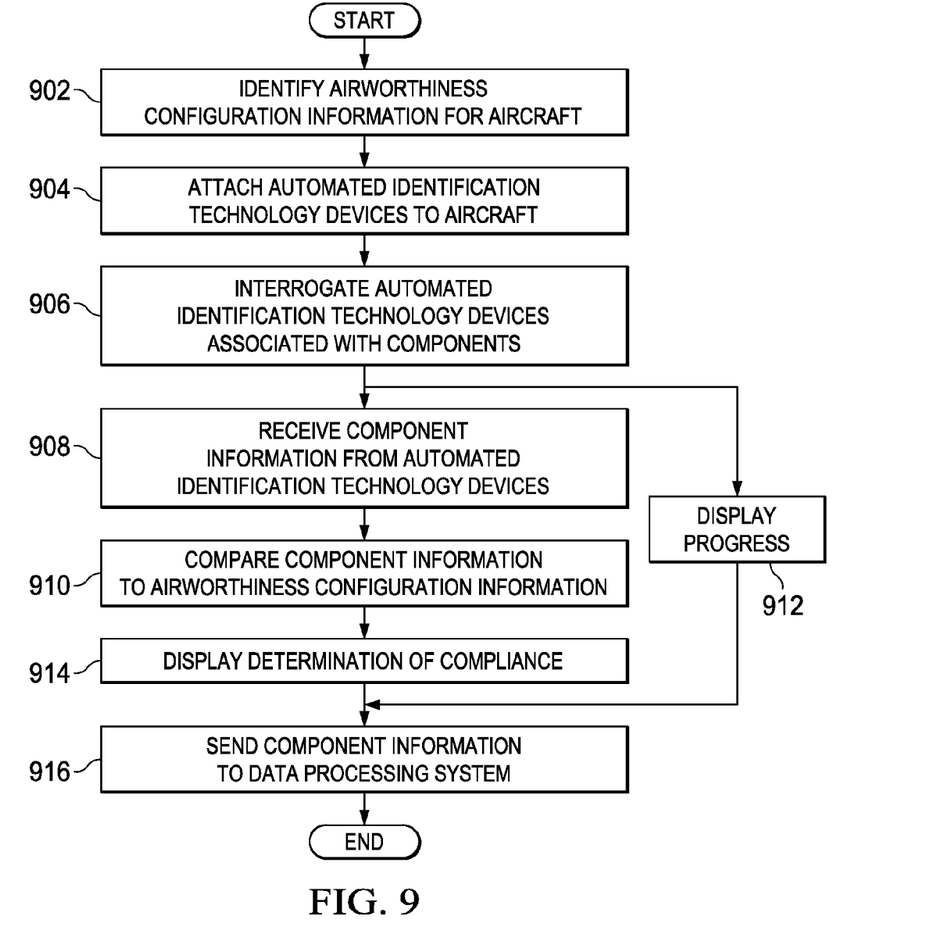
FIG. 9 is an illustration of a flowchart of a process for maintaining the airworthiness configuration of an aircraft in accordance with an illustrative embodiment.

Turning now to FIG. 9, an illustration of a flowchart of a process for maintaining the airworthiness configuration of an aircraft is depicted in accordance with an illustrative embodiment. The process may be implemented using reader 302 in FIG. 3.

The process begins by identifying airworthiness configuration information for an aircraft (operation 902). The airworthiness configuration information may identify an airworthiness configuration for the aircraft comprising a number of components of the aircraft. A number of automated identification technology devices then may be attached to the aircraft (operation 904). The number of automated identification technology devices may include component information for the number of components identified in the airworthiness configuration information.

When it is desired to determine whether the number of components comply with the airworthiness configuration defined by the airworthiness configuration information, the automated identification technology devices associated with components may be interrogated (operation 906). Component information from the automated identification technology devices may be received (operation 908) and compared to the airworthiness configuration information (operation 910). The progress of determining whether the number of components comply with the airworthiness configuration defined by the airworthiness configuration information may be displayed (operation 912) while the component information is being received at operation 908 and compared to the airworthiness configuration information at operation 910.

The determination of whether the number of components complies with the airworthiness configuration defined by the airworthiness configuration information may be displayed (operation 914). The component information read from the number of automated identification technology devices may be sent to a data processing system (operation 916), with the process terminating thereafter. The component information read from the number of automated identification technology devices may be stored by the data processing system to create a record of compliance or used for any other appropriate purpose.

Figure 10:
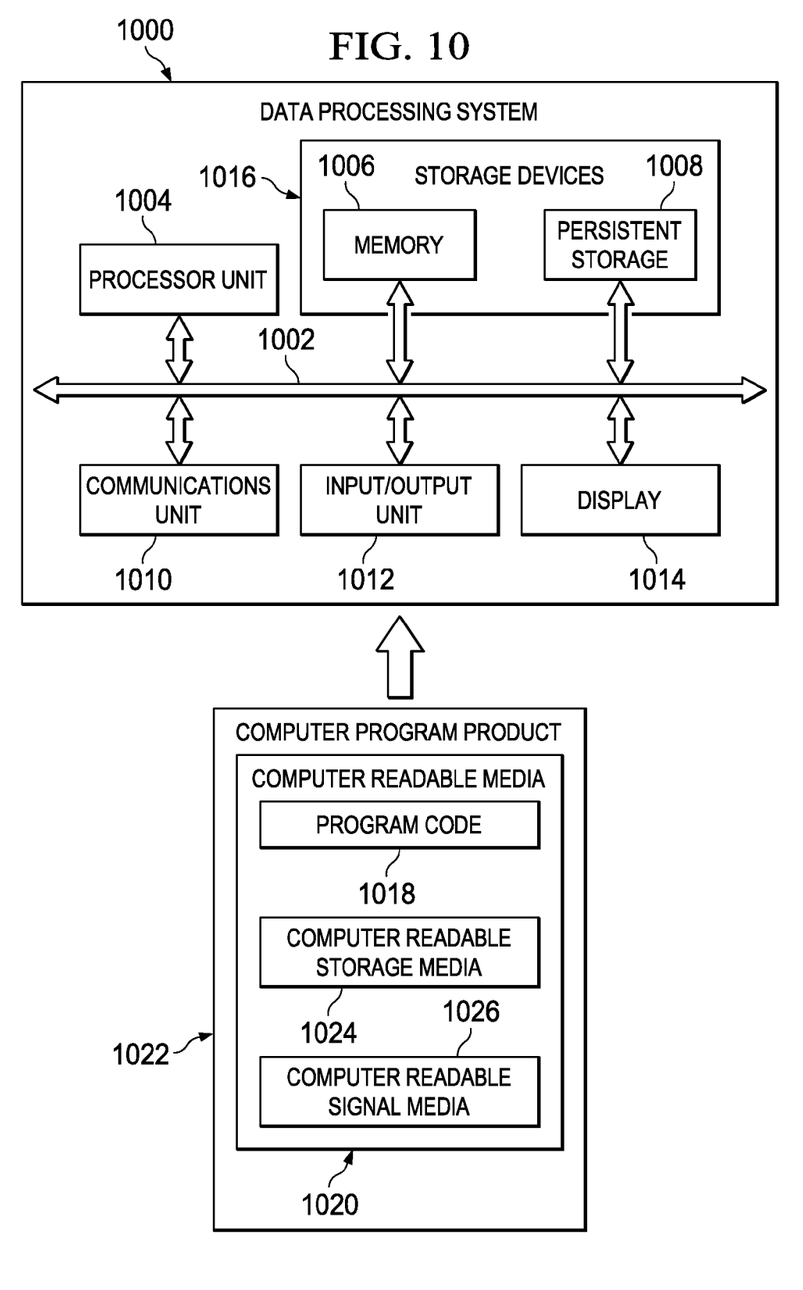
FIG. 10 is an illustration of a block diagram of a data processing system in accordance with an illustrative embodiment.

Turning now to FIG. 10, an illustration of a block diagram of a data processing system is depicted in accordance with an illustrative embodiment. In this example, data processing system 1000 is an example of one implementation of a data processing system for implementing reader 302 in FIG. 3.

In this illustrative example, data processing system 1000 includes communications fabric 1002. Communications fabric 1002 provides communications between processor unit 1004, memory 1006, persistent storage 1008, communications unit 1010, input/output (I/O) unit 1012, and display 1014. Memory 1006, persistent storage 1008, communications unit 1010, input/output (I/O) unit 1012, and display 1014 are examples of resources accessible by processor unit 1004 via communications fabric 1002.

Processor unit 1004 serves to run instructions for software that may be loaded into memory 1006. Processor unit 1004 may be a number of processors, a multi-processor core, or some other type of processor, depending on the particular implementation. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and other suitable information either on a temporary basis or a permanent basis. Storage devices 1016 also may be referred to as computer readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output unit 1012 allows for input and output of data with other devices that may be connected to data processing system 1000. For example, input/output unit 1012 may provide a connection for user input through a keyboard, a mouse, and/or some other suitable input device. Further, input/output unit 1012 may send output to a printer. Display 1014 provides a mechanism to display information to a user.

Instructions for the operating system, applications, and/or programs may be located in storage devices 1016, which are in communication with processor unit 1004 through communications fabric 1002. In these illustrative examples, the instructions are in a functional form on persistent storage 1008. These instructions may be loaded into memory 1006 for execution by processor unit 1004. The processes of the different embodiments may be performed by processor unit 1004 using computer-implemented instructions, which may be located in a memory, such as memory 1006.

These instructions are referred to as program instructions, program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these examples. In one example, computer readable media 1020 may be computer readable storage media 1024 or computer readable signal media 1026.

Computer readable storage media 1024 may include, for example, an optical or magnetic disk that is inserted or placed into a drive or other device that is part of persistent storage 1008 for transfer onto a storage device, such as a hard drive, that is part of persistent storage 1008. Computer readable storage media 1024 also may take the form of a persistent storage, such as a hard drive, a thumb drive, or a flash memory, that is connected to data processing system 1000. In some instances, computer readable storage media 1024 may not be removable from data processing system 1000.

In these examples, computer readable storage media 1024 is a physical or tangible storage device used to store program code 1018 rather than a medium that propagates or transmits program code 1018. Computer readable storage media 1024 is also referred to as a computer readable tangible storage device or a computer readable physical storage device. In other words, computer readable storage media 1024 is a media that can be touched by a person.

Alternatively, program code 1018 may be transferred to data processing system 1000 using computer readable signal media 1026. Computer readable signal media 1026 may be, for example, a propagated data signal containing program code 1018. For example, computer readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer readable signal media 1026 for use within data processing system 1000. For instance, program code stored in a computer readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to and/or in place of those illustrated for data processing system 1000. Other components shown in FIG. 10 can be varied from the illustrative examples shown. The different embodiments may be implemented using any hardware device or system capable of running program code. As one example, data processing system 1000 may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

In another example, a bus system may be used to implement communications fabric 1002 and may be comprised of one or more buses, such as a system bus or an input/output bus. Of course, the bus system may be implemented using any suitable type of architecture that provides for a transfer of data between different components or devices attached to the bus system.

Additionally, communications unit 1010 may include a number of devices that transmit data, receive data, or both transmit and receive data. Communications unit 1010 may be, for example, a modem or a network adapter, two network adapters, or some combination thereof. Further, a memory may be, for example, memory 1006, or a cache, such as that found in an interface and memory controller hub that may be present in communications fabric 1002.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of maintaining an airworthiness configuration of an aircraft, comprising:
    identifying, by a data processing system, airworthiness configuration information for the aircraft, such that the airworthiness configuration information identifies the airworthiness configuration of the aircraft comprising a number of components of the aircraft;
    attaching a number of automated identification technology devices to the aircraft, such that the number of automated identification technology devices comprise component information for the number of components, and attaching an automated technology device in the number of automated identification technology devices to a component, identified as requiring a tamper free state for aircraft airworthiness, in the number of components via an attachment structure comprising a tamper indicating feature such that disturbing the automated technology device resulting in the automated technology device not providing information from the automated technology device about the component;
    reading, by a reader, the component information from the number of automated identification technology devices;
    recognizing an automated technology device not providing component information as indicating a potential tampering with the component; and
    comparing, by a processor unit, the component information read from the number of automated identification technology devices to the airworthiness configuration information to determine whether the aircraft complies with the airworthiness configuration.

2. The method of claim 1, further comprising selecting the automated identification technology device from: radio frequency identification devices, and contact memory devices, comprising tear-off provisions such that tampering with the automated technology device separates an antenna from a microchip in the automated technology device.

3. The method of claim 1, wherein the component information comprises information identifying the number of components.

4. The method of claim 3, wherein the component information further comprises maintenance history information for the number of components.

5. The method of claim 1 further comprising sending the component information read from the automated identification technology devices from the reader to the data processing system and storing the component information read from the automated identification technology devices by the data processing system.

6. The method of claim 1, wherein the airworthiness configuration information further comprises:
    manufacturer instructions for continued airworthiness, manufacturer specified procedures for inspection, maintenance, repair, and replacement of the number of components, manufacturer specified definitions of the airworthiness configuration of the aircraft, operator rules provided by aircraft operators for the inspection and maintenance of the aircraft, and regulations specifying record-keeping for keeping a record of airworthiness compliance.

7. An apparatus, comprising:
    a data processing system that identifies airworthiness configuration information for an aircraft such that the airworthiness configuration information identifies an airworthiness configuration of the aircraft comprising a number of components of the aircraft;
    a number of automated identification technology devices attached to the aircraft such that the number of automated identification technology devices include component information for the number of components such that an automated technology device in the number of automated identification technology devices in the number of components, for a component identified as requiring a tamper free state for aircraft airworthiness, attaches via an attachment structure comprising a tamper indicating feature such that disturbing the automated technology device results in the automated technology device not providing information from the automated technology device about the component; and a reader that reads the component information from the number of automated identification technology devices and compares the component information read from the number of automated identification technology devices to the airworthiness configuration information to determine whether the aircraft complies with the airworthiness configuration, such that the reader recognizes an automated technology device not providing component information as indicating a potential tampering with the component.

8. The apparatus of claim 7, further comprising the automated identification technology device selected from: radio frequency identification devices, and contact memory devices, comprising tear-off provisions such that tampering with the automated technology device separates an antenna from a microchip in the automated technology device.

9. The apparatus of claim 7, wherein the component information comprises information identifying the number of components.

10. The apparatus of claim 9, wherein the component information further comprises maintenance history information for the number of components.

11. The apparatus of claim 7, wherein:
the reader is configured to send the component information read from the automated identification technology devices to the data processing system; and
the data processing system is configured to store the component information read from the automated identification technology devices.

12. The apparatus of claim 7, wherein the airworthiness configuration information further comprises:
manufacturer instructions for continued airworthiness, manufacturer specified procedures for inspection, maintenance, repair, and replacement of the number of components, manufacturer specified definitions of the airworthiness configuration of the aircraft, operator rules provided by aircraft operators for the inspection and maintenance of the aircraft, and regulations specifying record-keeping for keeping a record of airworthiness compliance.

13. A method for maintaining an airworthiness configuration of an aircraft, comprising:
attaching an automated technology device in to a component, identified as requiring a tamper free state for aircraft airworthiness, via an attachment structure comprising a tamper indicating feature such that disturbing the automated technology device resulting in the automated technology device not providing information from the automated technology device about the component, the automated technology device comprising tear-off provisions such that tampering with the automated technology device separates an antenna from a microchip in the automated technology device;

reading, by a processor, component information from automated identification technology devices attached to a number of components on the aircraft, such that the component information comprises identification information identifying the number of components;

comparing, by the processor, the component information to airworthiness configuration information identifying the airworthiness configuration of the aircraft to determine whether the number of components complies with the airworthiness configuration of the aircraft;

recognizing an automated technology device not providing component information as indicating a potential tampering with the component; and displaying, by the processor, indicators identifying whether the number of components comply with the airworthiness configuration of the aircraft.

14. The method of claim 13, further comprising:
associating the number of components with seats in a cabin on the aircraft; and
arranging the indicators in a manner corresponding to an arrangement of the seats in the cabin.

15. The method of claim 13 further comprising displaying an indication of progress of determining whether the number of components complies with the airworthiness configuration of the aircraft.

16. The method of claim 13, wherein the component information further comprises maintenance history information for the number of components.

17. The method of claim 13 further comprising sending the component information from a reader reading the component information from the automated identification technology devices to a data processing system separate from the reader.

18. The method of claim 13, wherein the airworthiness configuration information further comprises:
manufacturer instructions for continued airworthiness, manufacturer specified procedures for inspection, maintenance, repair, and replacement of the number of components, manufacturer specified definitions of the airworthiness configuration of the aircraft, operator rules provided by aircraft operators for the inspection and maintenance of the aircraft, and regulations specifying record-keeping for keeping a record of airworthiness compliance.

* * * * *